April 9, 1929.  C. A. RASTALL  1,708,326
STRAP END CONNECTION
Filed June 20, 1928
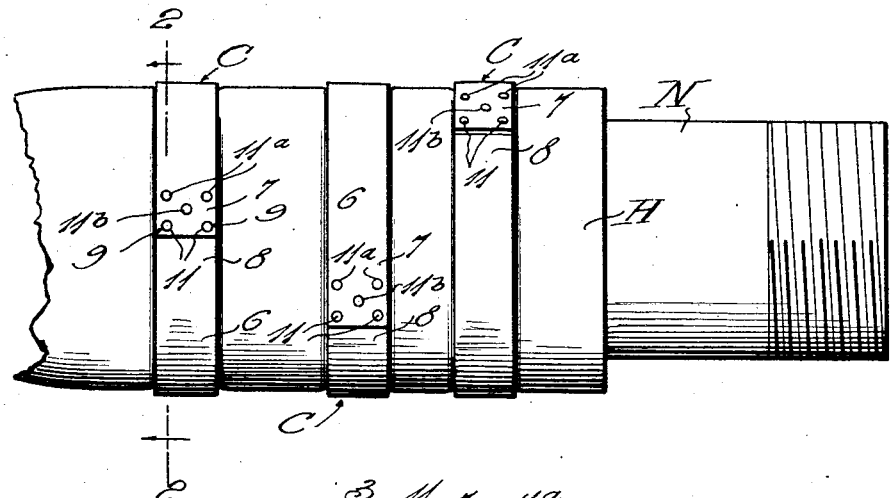
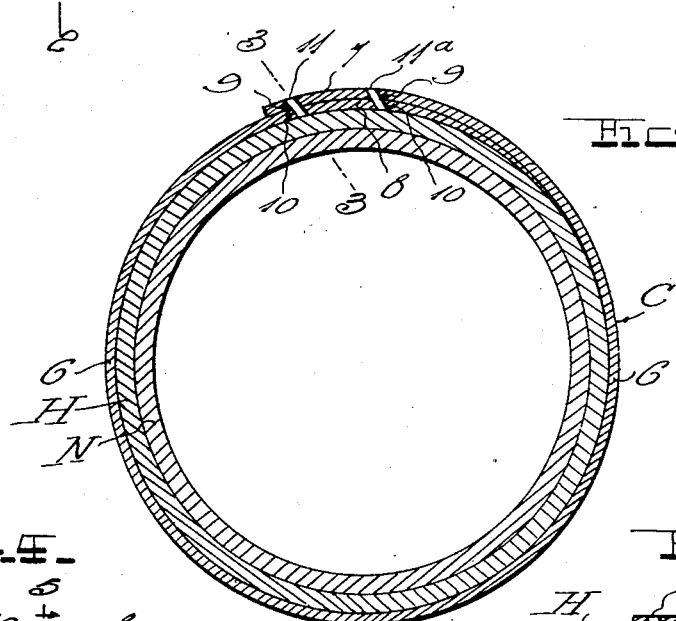
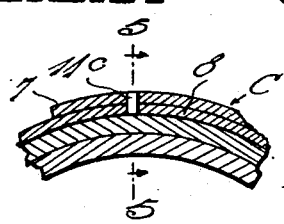
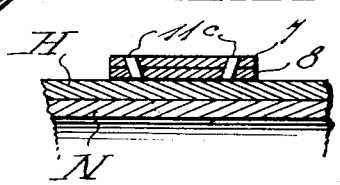
Witness
H. Woodard
Inventor
C. A. Rastall
By H. B. Willson & Co.
Attorneys Patented Apr. 9, 1929.

1,708,326

UNITED STATES PATENT OFFICE.

CHARLES A. RASTALL, OF OAKLAND, CALIFORNIA.

STRAP-END CONNECTION.

Application filed June 20, 1928. Serial No. 286,960.

The invention relates to a new and improved way of securing a metal strap around an object, for instance, around a piece of rubber hose, to clamp it upon a nipple or pipe. Heretofore, it has been customary to make use of hose clamps for this purpose, provided with bolts or screws whereby they may be contracted to clamping position. Often, the conditions under which the joint must be used, are such that the bolt or screw and the lugs with which it is engaged, are very much in the way and are subject to being struck and injured. It is therefore the object of my invention to provide an improved way of securing the ends of a flat metal strap in overlapped relation with each other, so that no parts project beyond the overlapped ends. Thus, when clamping a hose of four or five inches diameter, for instance, the joint will occupy approximately one inch less diameter than ordinarily.

With the foregoing in view, the invention resides in the novel subject matter hereinafter described and claimed, description being accomplished by reference to the accompanying drawing.

Fig. 1 is a side elevation of a joint embodying three of the metal straps each having its ends secured together in accordance with my invention.

Fig. 2 is a sectional view on line 2—2 of Fig. 1.

Fig. 3 is a detail section on line 3—3 of Fig. 2, showing a slightly different construction.

Fig. 4 is a detail section similar to a portion of Fig. 2, showing a slightly different form of construction.

Fig. 5 is a detail sectional view on line 5—5 of Fig. 4.

Three of the improved hose clamps C have been shown in Fig. 1, but as they are identical, only one will be described.

The clamp embodies a metal strap 6 having overlapped ends 7—8. The numerals 9 denote two openings formed in the strap end 7 and 10 denotes one of a pair of openings in the strap end 8, alined with the openings 9, the common axis of these alined openings being at an acute angle to the contacting faces of the strap ends 7—8. Pins 11 are inserted through the alined openings 9—10 and are flush with the inner and outer sides of the strap. As shown in Fig. 2, the angular positioning of each pin 11, is such as to cause the portion of said pin projecting beyond either strap end into the opening of the other strap end, to constitute an inwardly directed, acute hook, which tends to enter the opening to the maximum upon expanding strain exerted upon the clamp or strap. Hence, the strap ends are held against separation from each other and they cannot become accidentally disconnected.

In addition to having the openings and the pins 11 at an acute angle to the contacting faces of the strap ends in a plane longitudinally of the latter, said pins and openings are preferably acute to said contacting faces, transversely of the latter, as illustrated in Fig. 3, the pins being shown in outwardly diverging relation in this view.

One pin in some instances will suffice, but any desired number may be used. In addition to those specifically described, the form of construction shown in Figs. 1, 2 and 3 illustrates two additional pins 11ª bearing the same relation with the strap and with each other, as the pins 11, and still another pin 11ᵇ related with the strap ends in a manner similar to the relation above described.

Figs. 4 and 5 disclose a construction in which two pins 11ᶜ extend radially of the strap when viewed in longitudinal section of the latter as in Fig. 4 but are at acute angles to the strap ends and diverge from each other when viewed with the strap in transverse section as shown in Fig. 5. This relation of pins and appropriately positioned receiving openings therefor, holds the strap ends against separation and as they cannot thus become disconnected, the collar, strap or clamp is effectively held in its contracted position.

In applying the clamp, the strap 6 is placed around the object to be held, for instance, around a hose H surrounding a nipple or the like N. Then, preferably by the use of an appropriate clamp, the strap is contracted with its ends in overlapping relation and is held in this contracted position until the desired number of the openings are drilled through the overlapping strap ends, positioning said openings at the proper acute angles with respect to the contacting faces of said strap ends. Then, while the strap is still held in contracted position, the pins are inserted in the openings, whereupon the strap is released and will be tenaciously held contracted around the hose or the like.

While the details disclosed are preferable, variations may be made within the scope of the invention as claimed.

I claim:—

1. A hose clamp comprising a metal strap having overlapped ends each formed with two openings, one opening of one strap end being alined with one opening of the other strap end, and the other openings of said strap ends being also alined, the common axis of two of the alined openings being in diverging relation with the common axis of the other two alined openings, and diverging pins snugly received in said alined openings.

2. A structure as specified in claim 1; said pins and said axes of said openings being at acute angles to the contacting faces of the strap ends both longitudinally and transversely of said faces.

3. A hose clamp comprising a metal strap having overlapped ends, said ends having alined openings whose common axis is disposed at an acute angle to the length of the strap, and a pin of uniform diameter throughout its length snugly received in said opening and having its outer end flush with the exterior of the clamp, the portion of the pin projecting from either strap end into the opening of the other strap end constituting a hook in fixed acute angular relation with the circumference of the clamp and tending to move to the maximum into said opening of the other strap under expanding stress on the clamp.

In testimony whereof I have hereunto affixed my signature.

CHARLES A. RASTALL.